3,621,770
MULTIPLE-EXPOSURE DEVICE
Tomio Tsuruoka, Tokyo, Japan, assignor to Nippon
Kogaku K.K., Tokyo, Japan
Filed Apr. 17, 1969, Ser. No. 816,893
Claims priority, application Japan, Apr. 28, 1968,
43/32,862
Int. Cl. G03b 17/42, 9/68
U.S. Cl. 95—31 R                                10 Claims

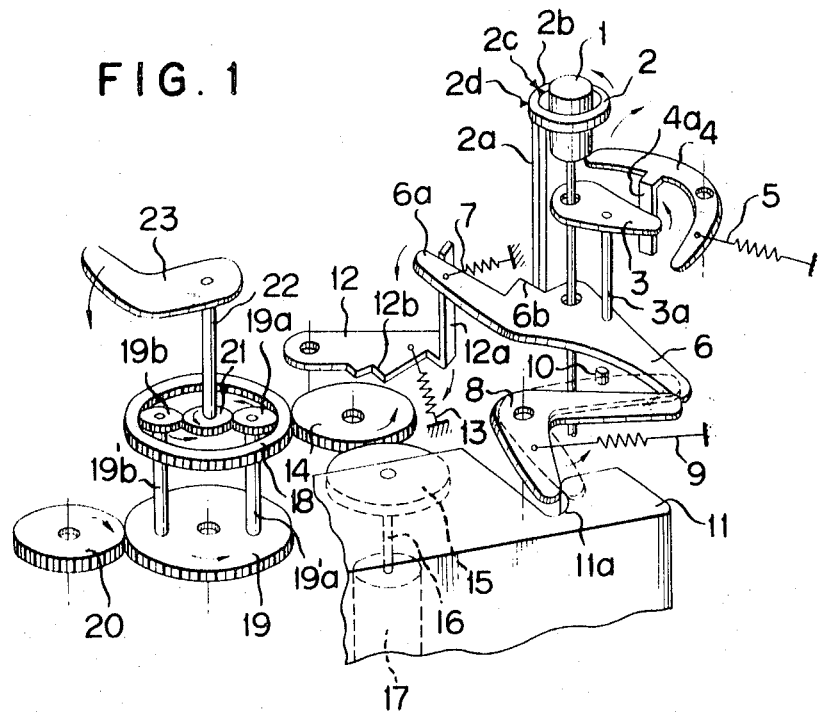
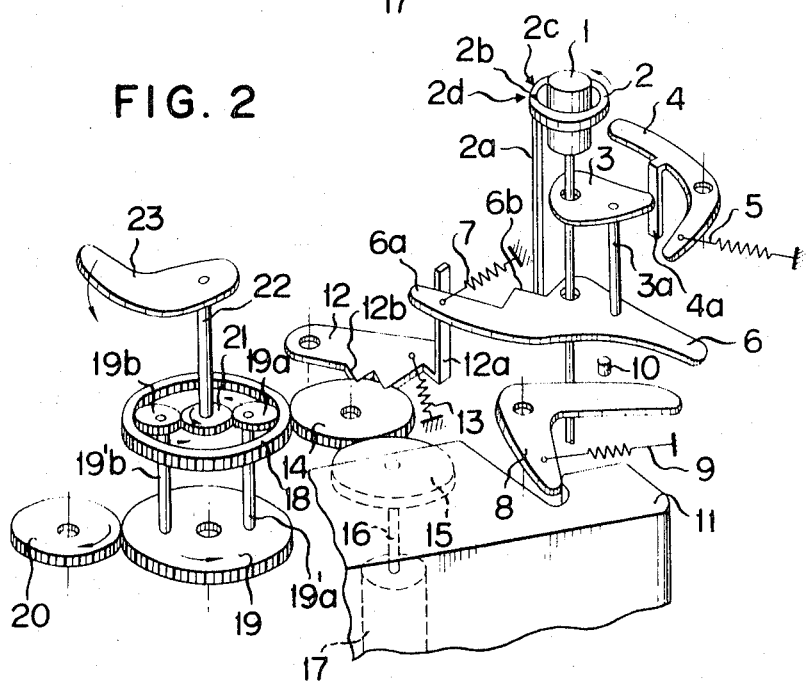

ABSTRACT OF THE DISCLOSURE

A multiple-exposure device for a camera comprising a film advance or winding member, a shutter charging mechanism and a film wind up mechanism employs a differential gear mechanism. A stop member, and a manually operable switching member which actuates the stop member, are provided in the film wind up mechanism. To make multiple-exposures, the stop member is actuated by the manually operable switching member to stop the film wind up mechanism and to enable only the shutter charging mechanism to operate. As a result, multiple-exposure operation is afforded until the switching member is returned to normal double exposure prevention operation.

---

This invention relates to a multiple exposure device for a camera.

The principal object of this invention is to provide a multiple exposure device having a film advance lever, shutter charge mechanism and film wind up mechanism which are interlocked respectively by a differential mechanism, for example, a planetary gear mechanism. According to the invention, when the film wind up mechanism is stopped, only the shutter charge mechanism operates without any influence upon the other mechanism, and once the film wind up mechanism has been stopped, multiple exposures are made possible consecutively for as many times as desired.

According to this invention, multiple exposure operation is furnished when a film advance interlocking gear is stopped, and consecutive multiple exposures may be made for as many times as desired by only winding up the film advance lever. The device of the invention is of simple construction and easy to operate.

In this invention, the multiple-exposure device is so constructed that the film advance lever is made to interlock with one of the operating members of a differential mechanism for example, a planetary gear mechanism that has at least three operating members. The film wind up mechanism and shutter charge mechanism are made to interlock with the remaining two operating members respectively, the said two mechanisms being operated either sequentially or simultaneously by the operation of the film wind up lever. A stopping member and a manually operable member that drives the stopping member are provided in the film wind up mechanism, the stopping member being driven by the manually operable member to stop the film wind up mechanism and to operate only the shutter charge mechanism.

The invention will be described with reference to a preferred embodiment thereof as shown in the drawings, in which:

FIG. 1 is a perspective view of the device of the invention with relation to a camera having an interchangeable camera back (a system in which the film compartment can be separated from the camera body and is interchangeable); and FIG. 2 is a perspective view similar to FIG. 1, this view showing the device in the state of making multiple exposures.

Referring to FIG. 1, 1 is a shutter release button, and 2 is a manually operable switching member. The switching member is in the form of a ring surrounding the shutter release button and is mounted for rotation. The switching member has a connecting rod 2a extending therefrom and has a mark 2b thereon. An interlocking member 3 is mounted for rotation about the shaft of the shutter release button 1. The interlocking member has one end thereof in engagement with an extension 4a of a safety lever 4. The safety lever is cooperable with the shutter release button 1. The intermediate member 3 is provided with a downwardly extending rod 3a connected to a changeover intermediate member 6. The rod serves to transmit the rotary motion of the changeover intermediate member 6 to the interlocking member 3.

The safety lever 4 constitutes retractable shutter release button engaging means cooperable with the shutter release button 1. The lever 4 is rotatably mounted, and is biased in a counter-clockwise direction by a spring 5. In the condition shown in FIG. 1, the shutter release button engaging means or lever 4 is in engagement with the release button. The changeover intermediate member 6, which is rotatable about the axis of the shaft upon which the shutter release button is mounted, has one end in contact with an extension 12a of stopping means or a gear stopping lever 12 and its opposite end in engagement with an interlocking lever 8. The changeover intermediate member 6 has a portion 6b in engagement with the connecting rod 2a of the manually operable switching member 2. The intermediate member 6 is biased in a clockwise direction by a spring 7. One end of the interlocking lever 8 extends into a notched section or portion 11a of a camera back 11, the other end of this lever being in engagement with the changeover intermediate member 6. The bifurcated interlocking lever 8 is rotatably supported upon a shaft connected to the camera body (not shown). A spring 9 biases the interlocking lever in a counter-clockwise direction with a force stronger than the force furnished by the tension spring 7. A stop 10 is provided to limit the extent of rotation of the interlocking lever 8.

As shown, the gear stopping lever 12 is provided with a pawl portion 12b which acts to stop a film wind up interlocking gear 14 when in engagement therewith. The lever 12 is rotatably supported upon a shaft mounted on the camera body (not shown). A spring 13 biases the gear stopping lever in a clockwise direction, this spring exerting a force which is less than the force furnished by the spring 7 acting on the changeover intermediate member 6. The film wind up interlocking gear 14 is in meshing engagement with a film wind up gear 15 and with a ring gear 18. The ring gear is provided with teeth on its external and internal circumferences, the film wind up interlocking gear 14 being in meshing engagement with the teeth on the external circumference as shown. The ring gear 18 is provided with a greater number of teeth on its outer or external circumference. The film wind up gear 15 is fixed to a film take up shaft 16 rotatably mounted on the camera back 11. A roll of film, designated 17, is mounted on the shaft 16.

Differential gearing is provided for cooperation with the toothed internal circumference of the ring gear 18. As shown, a pair of planetary gears 19a and 19b are in meshing engagement with the toothed internal circumference of the ring gear, and each of the planetary gears is in meshing engagement with an intermediate sun gear 21. The planetary gears are connected to a base gear 19 by the shafts 19'a and 19'b, the base gear being in meshing engagement with a shutter charging gear 20 of the shutter charging system. Oppositely, the sun gear 21 has a shaft 22 extending therefrom. This shaft, having one end fixed to the sun gear, is rotatably mounted on the camera body and has its opposite end fixed to a film advance or winding member 23. The load on the film advance side is smaller than that on the shutter charging side, and consequently, a fixed amount of load is applied to the film advance side first and then to the shutter charging side when the film winding member or lever 23 is operated.

When it is desired that the camera operate for normal picture taking, the mark 2b on the switching member 2 is set to the mark 2c. The film advance lever 23 is wound in the direction of the arrow, as shown in FIG. 1. Since the shutter charging force is greater than the film advancing force, the film wind up interlocking gear 14 is rotated by a specified amount by way of the sun gear 21 and the planetary gears 19a and 19b, and the film 17 is advanced by way of the film wind up gear 15. When the film 17 has been advanced for specified amount, the advancing load is increased and both the planetary gears 19a and 19b revolve around the sun gear 21 in the direction indicated by the arrows. Simultaneously, the base gear 19 is rotated in the direction of the arrow by way of the supporting shafts 19'a and 19'b, and the shutter system charging gear 20 is also rotated in the direction of the arrow to charge the shutter.

When multiple exposures are desired, the switching member 2 is rotated in the direction of the arrow until the mark 2b is aligned with the mark 2d. Then, the change-over intermediate member 6 is rotated in the direction of the arrow by the connecting rod 2a against the force of the spring 7. Consequently, the gear stopping lever 12 is rotated in the direction of the arrow by the force of the spring 13 and the pawl 12b engages the film wind up interlocking gear 14 to stop the film wind up interlocking gear 14. Moreover, the interlocking member 3 is rotated in the direction of arrow by way of the interlocking rod 3a and, simultaneously, the safety lever 4 that is in contact with the interlocking member 3 is rotated in the direction of arrow against the force of the spring 5 to release the hold upon the shutter release button 1. Then the whole mechanism is in the state as shown in FIG. 2.

When the film advance or winding lever 23 is rotated in the direction of the arrow, the sun gear 21 is rotated in the direction of the arrow by way of the rotary shaft 22. Since the ring gear 18 that is in engagement with the gear 14 cannot rotate in this case, the planetary gears 19a and 19b rotate around the sun gear 21 while rotating on their axes. Therefore, the base gear 19 and shutter system charging gear 20 are rotated by way of the supporting shafts 19'a and 19'b to charge the shutter, and exposure is made by depressing the shutter release button 1. Multiple exposures can be made consecutively for as many times as desired by operating the film advance lever 23. When the camera back 11 is removed from the camera body, the interlocking lever 8 is rotated in the direction of the arrow by the force of the spring 9, is stopped by the limit stop 10 at the position shown by dotted line in FIG. 1, and the change-over intermediate member 6 is rotated in the direction of arrow to be in the shutter chargeable condition, whereby only the shutter can be operated.

It is of course possible to provide the camera back 11 with an operating member equivalent to the switching member 2 that operates said gear stopping lever 12.

It is believed that the advantages and improved results provided by the device of the invention will be apparent from the foregoing detailed description. Various modifications and changes may be made without departing from the spirit and scope of the invention as set forth in the following claims.

What is claimed is:

1. A roll film camera having a film and shutter winding mechanism comprising a film winding member, a shutter release button, shutter charging means including a shutter charging gear, a ring gear having teeth on its external and internal circumferences, a film wind up interlocking gear in meshing engagement with the external the internal circumference, the differential gearing being connected to the film winding member and to the shutter charging gear, stopping means cooperable with the film wind up interlocking gear, retractable shutter release button engaging means cooperable with the shutter release button, and a manually operable switching member for actuating the shutter release button engaging means and said stopping means, the switching member being movable to one position wherein the stopping means is out of engagement with the film wind up interlocking gear and the shutter release button engaging means is in engagement with the shutter release button to furnish double exposure prevention operation, and to a second position wherein the stopping means is in engagement with the film wind up interlocking gear and the shutter release button engaging means is retracted from the shutter release button to furnish multiple exposure operation.

2. A roll film camera according to claim 1 wherein the stopping means comprises a pivoted stop lever having a pawl for engagement with the film wind up interlocking gear, the lever being normally maintained out of engagement with the film wind up interlocking gear.

3. A roll film camera according to claim 2 wherein the manually operable switching member comprises a rotatable, selecting ring surrounding the shutter release button, the ring having a mark thereon for alignment with one of a pair of spaced marks to selectively indicate double exposure preventing operation and multiple exposure operation.

4. A roll film camera according to claim 3 including a changeover intermediate member, and wherein the selecting ring has a connecting rod extending therefrom cooperable with said intermediate member, said intermediate member being cooperable with said stop lever, the retractable shutter release button engaging means being responsive to the position of said intermediate member.

5. A roll film camera according to claim 4 including a spring mounted, pivoted interlocking lever engageable by the changeover intermediate member, the interlocking lever being connected to a film magazine contained in a take up spool mounted on the camera, the detachment of the film magazine from the camera acting to move the interlocking lever and the pivoted changeover intermediate member to a position wherein the pivoted stop lever is in engagement with the film wind up interlocking gear and the shutter release button engaging means is retracted from the shutter release button to thereby furnish multiple exposure operation irrespective of the position of the selecting ring.

6. A roll film camera according to claim 1 wherein the differential gearing comprises a sun gear connected to the film winding member, a pair of planetary gears in meshing engagement with the sun gear and in meshing engagement with the internal circumference of the ring gear, a shaft extending from each planetary gear, each shaft being secured to a base gear in meshing engagement with said shutter charging gear.

7. A roll film camera according to claim 6 wherein the stopping means comprises a pivoted stop lever having a pawl for engagement with the film wind up interlocking gear, the lever being normally maintained out of engagement with the film wind up interlocking gear.

8. A roll film camera according to claim 7 wherein the manually operable switching member comprises a rotatable, selecting ring surrounding the shutter release button, the ring having a mark thereon for alignment with one of a pair of spaced marks to selectively indicate double exposure preventing operation and multiple exposure operation.

9. A roll film camera according to claim 8 including a changeover intermediate member, and wherein the selecting ring has a connecting rod extending therefrom cooperable with said intermediate member, said intermediate member being cooperable with said stop lever, the retractable shutter release button engaging means being responsive to the position of said intermediate member.

10. A roll film camera according to claim 9 including a spring mounted, pivoted interlocking lever engageable by the changeover intermediate member, the interlocking lever being connected to a film magazine contained in a take up spool mounted on the camera, the detachment of the film magazine from the camera acting to move the interlocking lever and the pivoted changeover intermediate member to a position wherein the pivoted stop lever is in engagement with the film wind up interlocking gear and the shutter release button engaging means is retracted from the shutter release button to thereby furnish multiple exposure operation irrespective of the position of the selecting ring.

References Cited

UNITED STATES PATENTS

| | | | |
|---|---|---|---|
| 2,728,282 | 12/1955 | Weiss | 95—31 ACFS |
| 2,304,887 | 12/1942 | Crumrine | 95—31 ACFS |
| 3,322,367 | 5/1967 | King | 242—71.4 |

FOREIGN PATENTS

| | | | |
|---|---|---|---|
| 1,187,127 | 2/1965 | Germany | 95—11 |

SAMUEL S. MATTHEWS, Primary Examiner

R. E. ADAMS, Jr., Assistant Examiner

U.S. Cl. X.R.

95—31 AC, 31 FL; 242—71.4

UNITED STATES PATENT OFFICE
CERTIFICATE OF CORRECTION

Patent No. 3,621,770  Dated November 23, 1971

Inventor(s) Tomio Tsuruoka

It is certified that error appears in the above-identified patent and that said Letters Patent are hereby corrected as shown below:

Column 4, line 5, after "ex-" insert -- ternal circumference, differential gearing cooperable with --.

Signed and sealed this 12th day of September 1972.

(SEAL)
Attest:

EDWARD M. FLETCHER, JR.
Attesting Officer

ROBERT GOTTSCHALK
Commissioner of Patents